United States Patent
Sharma et al.

(10) Patent No.: US 9,608,931 B2
(45) Date of Patent: Mar. 28, 2017

(54) MIGRATION ASSESSMENT FOR CLOUD COMPUTING PLATFORMS

(71) Applicant: Accenture Global Services Limited, Dublin (IE)

(72) Inventors: Vibhu Saujanya Sharma, Bangalore (IN); Shubhashis Sengupta, Bangalore (IN); Satish Nagasamudram, Bangalore (IN); Venkatesh Subramanian, Bangalore (IN); Chethana Dinakar, Bangalore (IN); Aravindan Thoppe Santharam, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 667 days.

(21) Appl. No.: 14/016,031

(22) Filed: Aug. 30, 2013

(65) Prior Publication Data

US 2014/0359129 A1    Dec. 4, 2014

(30) Foreign Application Priority Data

May 28, 2013  (IN) ............................ 2326/CHE/2013

(51) Int. Cl.
| | | |
|---|---|---|
| G06F 15/173 | (2006.01) | |
| H04L 12/911 | (2013.01) | |
| G06F 9/48 | (2006.01) | |
| G06F 9/455 | (2006.01) | |

(52) U.S. Cl.
CPC ............ *H04L 47/70* (2013.01); *G06F 9/4856* (2013.01); *G06F 2009/4557* (2013.01)

(58) Field of Classification Search
CPC .  H04L 47/70; H04L 12/911; H04L 29/08144; H04L 29/06; H04L 29/08072; H04L 29/08171; H04L 12/5695; G06F 2009/4557; G06F 9/4856
See application file for complete search history.

(56) References Cited

U.S. PATENT DOCUMENTS

| | | | |
|---|---|---|---|
| 2010/0125473 A1* | 5/2010 | Tung et al. ...................... 705/7 |
| 2011/0029946 A1* | 2/2011 | Joukov et al. ................ 717/100 |
| 2012/0131173 A1* | 5/2012 | Ferris et al. .................. 709/224 |
| 2012/0203823 A1 | 8/2012 | Manglik et al. |
| 2013/0091285 A1* | 4/2013 | Devarakonda et al. ...... 709/226 |
| 2014/0156813 A1* | 6/2014 | Zheng .................... H04L 67/16 709/220 |

(Continued)

OTHER PUBLICATIONS

Khadka, R. et al., "Legacy to SOA Evolution: Evaluation Results", Technical Report UU-CS-2012-006, Mar. 2012, Department of Information and Computing Sciences, UTrecht University, Utrecht, The Netherlands, 25 pages.

(Continued)

*Primary Examiner* — Wing F Chan
*Assistant Examiner* — Joseph Maniwang
(74) *Attorney, Agent, or Firm* — Mannava & Kang, P.C.

(57) ABSTRACT

Various embodiments provide an assessment tool that enables an automated functional assessment of applications for migration to target cloud computing platforms, such as a Platform as a Service (PaaS). The technical capabilities of various types of applications in a traditional non-platform deployment are studied and support for these technical capabilities is evaluated relative to the target platform.

18 Claims, 13 Drawing Sheets

(56) References Cited

U.S. PATENT DOCUMENTS

2014/0280978 A1* 9/2014 Martinez et al. ............ 709/226

OTHER PUBLICATIONS

"Patent Examination Report No. 1", Australia Patent Application No. 2014202907, dated Nov. 13, 2014, 7 pages, IP Australia.
Weiqing Zhang: "Migrating legacy applications to the service cloud", Towards best practices in Cloud Computing-Selected Papers from workshops on Cloud Computing at OOPSLA09, Orlando, 2009, Oct. 2009, 76 pages.
European Patent Office, "The extended European search report", EP Patent Application No. 14170418.9, dated Nov. 14, 2014, 11 pages.
"Apache Tomcat 6.0; Clustering/Session Replication How-To", retrieved from http://tomcat.apache.org/tomcat-6.0-doc/cluster-howto.html on Apr. 29, 2013, (Oct. 16, 2012),7 pages.
"Apache Tomcat", screenshot retrieved from http://tomcat.apache.org/ on Apr. 29, 2013, (Mar. 26, 2013), 3 pages.
"ASM", OW2 Consortium; screenshot retrieved from http://asm.ow2.org/index.html on Apr. 29, 2013 (Oct. 21, 2012), 1 page.
"Cloud Foundry", VMWare; retrieved screenshot from http://www.cloudfoundry.com/ on Apr. 29, 2013, (Apr. 15, 2013), 2 pages.
"Drools", JBoss; Retrieved from www.jboss.org/drools/ on Apr. 29, 2013, (Apr. 29, 2013), 4 pages.
"Heroku Cloud Application Platform", retrieved screen shot from http://www.heroku.com on Apr. 29, 2013, (Apr. 29, 2013), 1 page.
"Jaxb Reference Implementation", retrieved from https//jaxb.java.net on Apr. 29, 2013, (Apr. 29, 2013), 2 pages.
"Maven", Apache; screenshot retrieved from http://www.maven.apache.org on Apr. 29, 2013, (Apr. 29, 2013) 2 pages.
"Openshift", RedHat; Retrieved screenshot from https://openshift.redhat.com/app/ on Apr. 29, 2013 (Apr. 25, 2013), 4 pages.
"Rabbitmq Messaging Solution", VMWare; Screen shot retrieved from http://www.rabbitmq.com/ on Apr. 29, 2013, (Apr. 29, 2013), 1 page.
"Tomcat Tutorial: Persistent Sessions http Sessions", retrieved from http://www.oxxus.net/tutorials/tomcat/persistent_sessions on Apr. 29, 2013, (Apr. 29, 2013), 2 pages.
"Windows Azure Cloud", Microsoft; retrieved screen shot from http://www.windowsazure.com on May 22, 2013, (2013), 2 pages.
Babar, Muhammad A., et al., "A Tale of Migration to Cloud Computing for Sharing Experiences and Observations", in Proceedings of the 2nd International Workshop on Software Engineering for Cloud Computing, ser. SECLOUD '11. New York, NY, USA: ACM (2011), pp. 50-56.
Bächle, Michael et al., "Ruby on Rails", Software; IEEE; vol. 24, No. 6, (Nov.-Dec. 2007), pp. 105-108.
Khajeh-Hosseini, Ali et al., "Cloud Migration: A Case Study of Migrating an Enterprise IT System to IaaS", in Cloud Computing (CLOUD); 2010 IEEE 3rd International Conference, (Jul. 2010), pp. 450-457.
Knoernschild, Kirk "Jaranalyser", retrieved from http://kirkk.com/main/Main/JarAnalyzer on Apr. 29, 2013, (Apr. 29, 2013), 2 pages.
Leff, Avraham et al., "Web-Application Development Using the Model/View/Controller Design Pattern", in Enterprise Distributed Object Computing Conference, 2001; EDOC '01; Proceedings; Fifth IEEE International, (2001), pp. 118-127.
Sharma, Vibhu S., et al., "PIVoT: Project Insights and Visualization Toolkit", in Emerging Trends in Software Metrics (WETSoM); 2012 3rd International Workshop, (Jun. 2012), pp. 63-69.

* cited by examiner

300 

```xml
<?xml version="1.0" encoding="UTF-8" ?>
- <services>
   + <serviceCategory name="Framework" descr="Application Framework for
       developing Java Applications">
   - <serviceCategory name="Batch Process" descr="Batch Process to simplify
       and optimize the work of processing high volume batch operations">
      - <serviceType name="Spring-Batch" version="3.1" desc="Spring
          framework to simplify and optimize the work of processing high
          volume batch operations"
         - <searchInSource name="sourceOrConfig">
            - <searchInSource name="source">
               - <searchInStyle name="optional">
                    <pattern name="org.springframework.batch" />
                    <pattern name="org.springframework.batch.core" />
                  </searchInStyle>
               </searchInType>
             - <searchInType name="config">
                - <searchInStyle name="required">
                     <pattern name="org.springframework.batch.core" />
                  </searchInStyle>
               </searchInType>
            </searchInSource>
         </serviceType>
       + <serviceType name="Spring-Batch-File" version "3.1" desc="Spring
           framework to simplify and optimize the work of processing high
           volume batch operations">
      </serviceCategory>
   + <serviceCategory name="Transaction Management" descr="Transaction
       Management Services">
   + <serviceCategory name="Security" descr="Security Services">
   + <serviceCategory name="Database Access" descr="Database Access
       Services">
   + <serviceCategory name="Database Access-ORM" descr="Database Access-
```

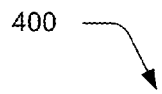

```
<?xml version="1.0" encoding="ISO-8859-1" ?>
<target name='CloudFoundry' version="1.0">
- <services>
  + <serviceCategory name='Framework">
  + <serviceCategory name='Validation Services">
  + <serviceCategory name='Scheduler Services">
  - <serviceCategory name='File Services'>
    - <serviceType>
      <name>Java-FileServices</name>
      <version>1.6</version>
      <support>R</support>
      - <recommendation>
        <![CDATA[ External File Services are not supported ]]>
      </recommendation>
      - <extraCaveats>
        <![CDATA[ Files can be stored only on a temporary directory. But they will be deleted
        once the serv
      </extraCaveats>
    </serviceType>
  </serviceCategory>
```

Fig. 4

| Project | Analysis Run Date |
|---|---|
| NovaMAT | 19-Feb-13 |

| Service Category | Description |
|---|---|
| Database Access-ORM | Database Access-Object Relational Mapping (ORM) |
| File Services | File Services |
| Graphical User Interface | Graphical User Interface |
| Logging | Logging |
| Security | Security |
| Service Lookup | Service Lookup |
| Transaction Management | Transaction Management |
| Validation Services | Validation Services |
| Web-ClientServer | Web-ClientServer |

| Service Type | Description |
|---|---|
| Java-FileServices | File Services in Java |

| File | Pattern Detected | Line Content | Dependency Level |
|---|---|---|---|
| com/ati/nglm/migration/controllers/MigrationController.java | java.io.FileNotFoundException | PIVoTLOGGER.getInstance | PIVoTCommons.jar->PIVoTLOGGER |
| com/ati/nglm/migration/controllers/MigrationController.java | java.io.FileInputStream | PivotStream pivotStream | PIVoTCommons.jar->PivotStream |

Fig. 8

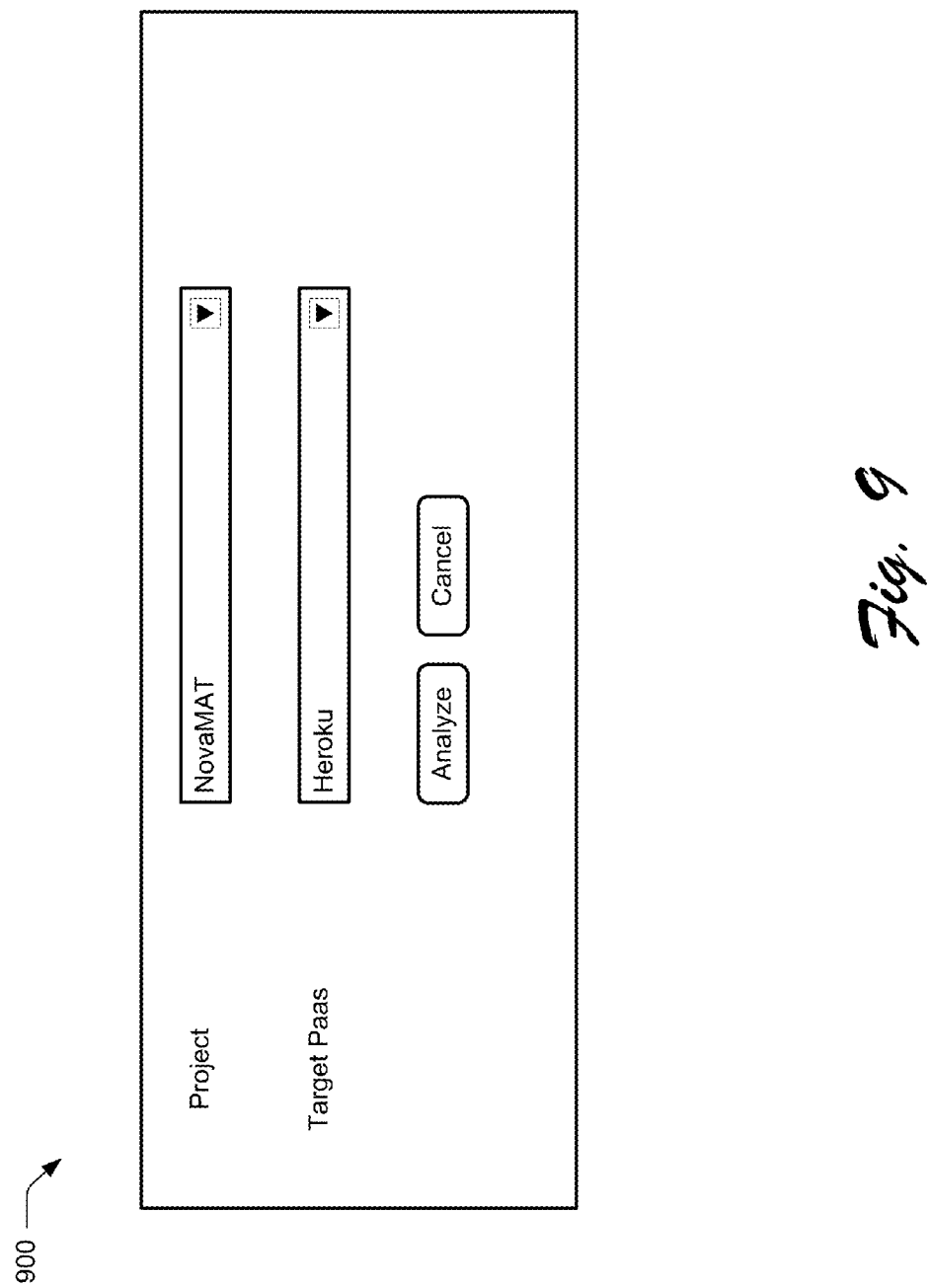

| Project | Analysis Run Date |
|---|---|
| NovaMAT | 19-Feb-13 |

| Service Category | Description |
|---|---|
| Database Access-ORM | Database Access-Object Relational Mapping (ORM) |
| File Services | File Services |
| Graphical User Interface | Graphical User Interface |
| Logging | Logging |
| Security | Security |
| Service Lookup | Service Lookup |
| Transaction Management | Transaction Management |
| Validation Services | Validation Services |
| Web-ClientServer | Web-ClientServer |

| Service Type | Description |
|---|---|
| Apache Logging Framework – Console Based | Apache Logging Framework – Console Based |
| Apache Logging Framework – File Based | Apache Logging Framework – File Based |

| Services | Cloud Foundry | Heroku |
|---|---|---|
| Database Access-ORM | | |
| Spring-ORM( Object Relational Mapping) | ◉ | ◉ |
| File Services | | |
| Java-File Services | ✗ | ◉ |
| Graphical User Interface | | |
| Spring-Graphical User Interface | ◉ | ◉ |
| Logging | ◉ | ◉ |
| Apache Logging Framework-File Based | ◉ | ◉ |
| Security | | |
| Java-Security | ✓ | ✓ |
| Service Lookup | | |
| JNDI | ◉ | ✓ |

Fig. 13

MIGRATION ASSESSMENT FOR CLOUD COMPUTING PLATFORMS

RELATED APPLICATION

This application claims priority under 35 USC 119 to India Application No. 2326/CHE/2013 filed May 28, 2013, the disclosure of which is incorporate in its entirety.

BACKGROUND

Platform as a Service (PaaS) is one category of cloud computing services that provides a computing platform and a solution stack as a service. Using PaaS, a customer creates software using tools and/or libraries from a PaaS provider and controls software development and configuration settings. The PaaS provider provides the networks, servers, storage, as well as other services.

The PaaS cloud marketplace has grown significantly in the past couple of years. PaaS has grown both in terms of customers adopting the platforms to develop and deploy applications as well as in terms of maturity of the platforms offered by various vendors. Platform as a service paradigm is based on the premise of providing users the flexibility of developing and deploying applications without caring about issues related to infrastructure and platform provisioning.

As such, PaaS cloud platforms are becoming an attractive proposition for software developers. A PaaS cloud, unlike an Infrastructure cloud, frees the user from taking the responsibility of applying updates to the platform or provisioning and managing the underlying infrastructure. Furthermore, unlike Software as a Service (SaaS) cloud, a PaaS cloud platform allows the developer to have flexibility and control over what the application does and how it implements the functionality. The majority of the PaaS cloud platforms provide development environments along with a set of technical services, frameworks and capabilities, in addition to the hosting infrastructure support in terms of CPU, memory, disks and network bandwidth.

In a PaaS platform, the base application platforms (e.g., Operating Systems, Database, Application stacks, Web-servers and related modules) are supplanted by external technical services or add-ons (like queues, caches, etc.), which an application can consume in a paid or free manner. Faster and feature-rich development and hosting environments, rapid deployment and testing capability, massive scalability, no licensing hassles and, pay-as-you-go cost models are making PaaS platforms appealing to the enterprise software development community.

However, the PaaS cloud platforms are relatively new and immature. Different PaaS vendors may have different sets of architectures, platform capabilities, and restrictions related to software development and configuration. These variations and limitations need to be evaluated carefully while developing or migrating an enterprise application to a PaaS platform.

SUMMARY

This Summary is provided to introduce a selection of concepts in a simplified form that are further described below in the Detailed Description. This Summary is not intended to identify key features or essential features of the claimed subject matter.

Various embodiments provide an assessment tool that enables an automated functional assessment of applications for migration to a target cloud computing platform, e.g., a Platform as a Service (PaaS) platform, to be performed. In at least some embodiments, an automated migration assessment tool receives code associated with an application that is to be migrated to a target cloud computing platform. Using the automated migration assessment tool, the code is analyzed to assess dependence of the code on technical utility services and capabilities. The target cloud computing platform is then evaluated for support for dependent technical utility services and capabilities.

In one or more other embodiments, a system is implemented as computer readable instructions embodied on one or more computer readable storage media. The system comprises an automated migration assessment tool configured to allow migration assessment of code that is to be migrated to a Platform as a Service (PaaS) platform. The migration assessment tool comprises an analysis engine configured to assess code dependence on technical utility services and capabilities and produce dependency information. A rule engine is configured to attempt to match patterns in a list of technical utility services and capabilities with information appearing in the dependency information effective to produce a subset of patterns that are present in the code. A migration evaluation engine is configured to map the subset of patterns present in the code to a list of technical services supported by the PaaS platform effective to produce a migration list. A report engine is configured to process the migration list to create a report that describes support, in the PaaS platform, for the subset of patterns present in the code.

In yet other embodiments, a computing device comprises one or more processors, one or more computer readable storage media embodying computer readable instructions which, when executed by the one or more processors, implement a system comprising a migration assessment tool configured to enable migration assessment of code that is to be migrated to a Platform as a Service (PaaS) platform. The migration assessment tool is configured to: analyze the code and produce an XML file that describes the code's dependencies on technical utility services and capabilities; attempt to match patterns in a hierarchical list of technical utility services and capabilities with dependencies described in the XML file and produce an XML list that describes a subset of patterns present in the code; process the XML list to map the subset of patterns present in the code to a hierarchical list of technical services supported by the PaaS platform effective to produce a migration list; and create a report that describes support, in the PaaS platform, for the subset of patterns present in the code.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

FIG. 3 is an excerpt of XML in accordance with one or more embodiments.

FIG. 4 is an excerpt of XML in accordance with one or more embodiments.

FIG. 8 illustrates an example report in accordance with one or more embodiments.

FIG. 9 illustrates a user interface of the migration assessment tool in accordance with one or more embodiments.

FIG. 11 illustrates a portion of an example report in accordance with one or more embodiments.

FIG. 13 illustrates an example report in accordance with one or more embodiments.

DETAILED DESCRIPTION

Overview

Figure 1:
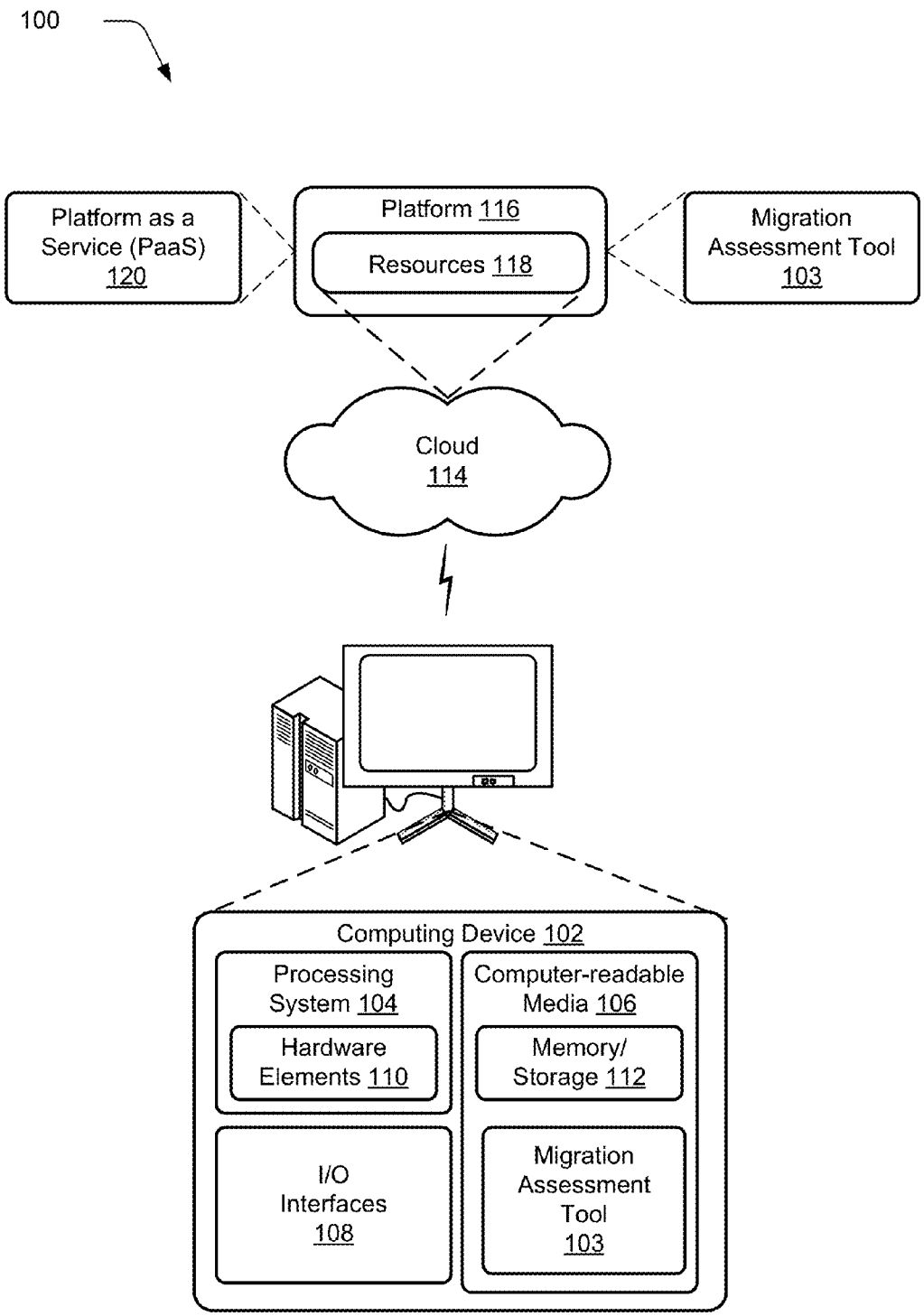
FIG. 1 illustrates an example operating environment in accordance with one or more embodiments.

Various embodiments provide an assessment tool that supports automated functional assessment of applications for migration to a target cloud computing platform, e.g., a Platform as a Service (PaaS) platform, Infrastructure as a Service (IaaS), and the like. In the context of Paas platforms, the technical capabilities of various types of applications in a traditional non-PaaS deployment are studied and support for these technical capabilities is evaluated relative to the target PaaS platform.

In one or more embodiments, two rich sets of capability repositories are created and utilized during an application's automated functional assessment. A first of the repositories is an extendable Red List which corresponds to the typical capabilities and services used in a traditional deployment technology. The Red List contains the various technical services and their classification with their corresponding code pattern which the automated assessment tool can detect in code. A second of the repositories is an extendable Blue List which contains information pertaining to the level of support for service or technical capability in the particular PaaS. Each PaaS typically has a different Blue List. In one or more embodiments, the Blue List can further include a set of recommendations to enable the use of an otherwise non-supported service or capability on the respective PaaS.

For migration assessment, a user typically submits the application code to the automated assessment tool along with some auxiliary information through a user interface. The automated assessment tool then uses the Red List to detect various patterns of different functional capabilities and services within the code. The detected patterns are then checked against the Blue List for one or more target PaaS platforms and, for each capability or service, a migration suitability indicator (e.g., Green, Amber, and Red) is assigned. The analysis results are then presented to the user through a dynamic user interface in which the user can receive a high level view, as well as a detailed view of the migration assessment for different services. Through the indicators and the recommendations presented in this user interface, the user can evaluate the suitability and complexity of migrating the application to a particular PaaS.

In the discussion that follows, a section entitled "Example Environment" describes an example environment in which the various embodiments can be utilized. Next, a section entitled "Example Migration Assessment Tool" describes a migration assessment tool in accordance with one or more embodiments. Following this, a section entitled "Migration Assessment" describes aspects of migration assessment and includes several subsections that describe a multi-stage approach to migration assessment in accordance with one or more embodiments. Next, a section entitled "Example Method" describes an example method in accordance with one or more embodiments. Last, a section entitled "Implementation Example—Migration Assessment Tool" describes aspects of one implementation in accordance with one or more embodiments.

Consider now an example environment in which various embodiments can be practiced.

Example Environment

FIG. 1 illustrates an example system generally at 100 that includes an example computing device 102 that is representative of one or more computing systems and/or devices that may implement the various techniques described herein. This is illustrated through inclusion of a migration assessment tool 103, which may reside on computing device 102 or, alternately or additionally, may reside remotely from computing device 102 as indicated. The computing device 102 may be, for example, a server of a service provider, a device associated with a client (e.g., a client device), an on-chip system, and/or any other suitable computing device or computing system.

The example computing device 102 as illustrated includes a processing system 104, one or more computer-readable media 106, and one or more I/O interface 108 that are communicatively coupled, one to another. Although not shown, the computing device 102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 104 is representative of functionality to perform one or more operations using hardware. Accordingly, the processing system 104 is illustrated as including hardware elements 110 that may be configured as processors, functional blocks, and so forth. This may include implementation in hardware as an application specific integrated circuit or other logic device formed using one or more semiconductors. The hardware elements 110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 106 is illustrated as including memory/storage 112. The memory/storage 112 represents memory/storage capacity associated with one or more computer-readable media. The memory/storage component 112 may include volatile media (such as random access memory (RAM)) and/or nonvolatile media (such as read only memory (ROM), Flash memory, optical disks, magnetic disks, and so forth). The memory/storage component 112 may include fixed media (e.g., RAM, ROM, a fixed hard drive, and so on) as well as removable media (e.g., Flash memory, a removable hard drive, an optical disc, and so forth). The computer-readable media 106 may be configured in a variety of other ways as further described below.

The computer readable media 106 also includes a migration assessment tool 103 that operates as described above and below. Specifically, the migration assessment tool 103 enables an automated functional assessment of applications to be performed in association with migration of applications to a target PaaS platform, as described below in more detail. It is to be appreciated and understood, however, that the techniques described herein can be employed in connection with platforms other than a PaaS platform.

Input/output interface(s) 108 are representative of functionality to allow a user to enter commands and information to computing device 102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 102 may be configured in a variety of ways as further described below to support user interaction.

Various techniques may be described herein in the general context of software, hardware elements, tools or program modules. Generally, such tools or modules include routines, programs, objects, elements, components, data structures, and so forth that perform particular tasks or implement particular abstract data types. The terms "module," "functionality," "tool" and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 110 and computer-readable media 106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 110. The computing device 102 may be configured to implement particular instructions and/or functions corresponding to the software and/or hardware modules. Accordingly, implementation of a module that is executable by the computing device 102 as software may be achieved at least partially in hardware, e.g., through use of computer-readable storage media and/or hardware elements 110 of the processing system 104. The instructions and/or functions may be executable/operable by one or more articles of manufacture (for example, one or more computing devices 102 and/or processing systems 104) to implement techniques, modules, and examples described herein.

The techniques described herein may be supported by various configurations of the computing device 102 and are not limited to the specific examples of the techniques described herein. This functionality may also be implemented all or in part through use of a distributed system, such as over a "cloud" 114 via a platform 116 as described below.

The cloud 114 includes and/or is representative of a platform 116 for resources 118. The platform 116 abstracts underlying functionality of hardware (e.g., servers) and software resources of the cloud 114. The resources 118 may include applications and/or data that can be utilized while computer processing is executed on servers that are remote from the computing device 102. Resources 118 can also include services provided over the Internet and/or through a subscriber network, such as a cellular or Wi-Fi network. Platform 116 can also support one or more Platform as a Service (PaaS) platforms 120, as well as other cloud computing platforms. The platform 116 may abstract resources and functions to connect the computing device 102 with other computing devices. The platform 116 may also serve to abstract scaling of resources to provide a corresponding level of scale to encountered demand for the resources 118 that are implemented via the platform 116. Accordingly, in an interconnected device embodiment, implementation of functionality described herein may be distributed throughout the system 100. For example, the functionality may be implemented in part on the computing device 102 as well as via the platform 116 that abstracts the functionality of the cloud 114, as indicated by the migration assessment tool being illustrated at both the computing device 102 and the platform 116.

Having described an example environment in which the inventive principles can be employed, consider now a discussion of PaaS platforms and an example migration assessment tool that can be used for automated functional assessment of an application, in accordance with one or more embodiments.

Example Migration Assessment Tool

Prior to describing an example migration assessment tool, consider the following with respect to PaaS platforms in general. As noted above, different PaaS platforms may support different programming languages (like Java, Python, and Ruby etc.), different versions of the same language, and/or different library extensions for these languages. There may also be differences in container sizes, freedom of configurability, network restrictions, and the like. Many PaaS vendors offer multiple heterogeneous platform stacks and configurations catering to different developmental needs. The techniques described herein can be employed in connection with PaaS and non-PaaS platforms. For example, the techniques can be employed in connection with IaaS platforms with a pre-configured stack such as LAMP (Linux Apache mod-Perl), as well as others. However, the example described below is described in the context of a PaaS platform.

Similarly, different vendors may offer different architectural stacks, different operating systems, databases and webserver versions, different architectural frameworks like Java MVC or Rails, and the like. Components or processes deployed on a PaaS cloud may also exhibit different threading and task models (e.g., user-facing processes or Web roles in some platforms may not allow multi-threading). PaaS platforms can also differ in terms of nature and degree of technical utility services or capabilities they provide. For example, Web session replication and management is a useful technical utility provided in standard enterprise architecture, but this capability is missing in many PaaS cloud platforms.

To an enterprise architect, accustomed to mature and relatively standardized environments within an organization, this multitude of possible development and execution environments clearly poses a challenge of choosing the right platform. Thus, while migrating an application to a PaaS platform, the demands of the application are to be addressed in terms of the platform, the dependencies, and interoperability with other applications, while also making sure that the technical services needed in the application are provided by the PaaS provider.

The migration assessment tool described below enables performance of a comprehensive code assessment for checking the migration-readiness of existing enterprise applications to a particular PaaS platform. In the illustrated and described embodiments, the migration assessment approach is based on analyzing the dependence of an application's code on technical utility services and capabilities and evaluating the support for those services and capabilities in the target PaaS platform(s). In the example described below, the existing enterprise applications are described in the context of Java-based enterprise applications and two target PaaS platforms—Heroku and CloudFoundry. It is to be appreciated and understood, however, that enterprise applications other than Java-based enterprise applications can be analyzed using the migration assessment tool, without departing from the spirit and scope of the claimed subject matter. For example, the techniques described herein can be employed in connection with any language that supports static analysis such as Microsoft .Net, JVM-based languages like Scala, JRuby, and the like. Further, it is to be appreciated and understood that PaaS platforms other than those mentioned above can be utilized in connection with the migration assessment tool without departing from the spirit and scope of the claimed subject matter.

Having considered the general discussion above on PaaS platforms, consider now a discussion that describes an approach of systematically evaluating migration-readiness of an enterprise Java application to a target PaaS cloud in accordance with one embodiment.

Migration Assessment

An enterprise application can be viewed as having two constituents a) a set of core business logic or computation classes and, b) an external set of technical utility services on which the core classes are dependent to carry out certain operations such as, File services, Persistence services, Security, Logging services, and so on. In the landscape of enterprise applications, such services are used as common or shared services across applications.

In order to move an application to a PaaS cloud, an investigation is made to ascertain whether and how the technical utility services are supported in the target PaaS platform. If any of the required technical services are not supported, an investigation is conducted to ascertain whether there is a way to re-write the application with minor or moderate changes (such as an update service version or re-write with a different package), or if the application will have to undergo significant changes (e.g., the utility service paradigm itself changes, or the entire dependency gets broken, or a major version update is required). The cost and effort to migrate the application to a particular cloud will necessarily depend on such assessment reports.

In the migration assessment approach described below, a 5-stage process is utilized to conduct an automated functional assessment of applications for migration to a target PaaS platform. In the illustrated and described embodiment, stages 1 through 3 are performed manually. In these stages, a comprehensive migration assessment tool (MAT) database of facts and advisories is created to help the assessment logic. Stages 4 and 5 are automated and it is in these stages where the actual code analysis and migration assessment is performed in a MAT engine, described below in more detail.

Stage 1

In one or more embodiments, in stage 1 a taxonomy and hierarchical categorization of different external technical utility services is created in a systematic way. In the illustrated example, a list of utility services or frameworks for a particular n-tier enterprise technology stack (e.g., proprietary stacks such as IBM or Oracle or Open Source stacks such as Apache or JBoss) is created. The list of utility services or frameworks is referred to as a "Red List". By way of example and not limitation, an example Red List of service categories is shown just below:

Proxy and load balancing
Caching (application, data)
Application/service discovery and lookup
Session state management
Clustering/availability management
Application monitoring
Logging
Transaction Processing services Batch processing
Batch data interfaces
Message Queues
Web services interfaces
Database management and persistence services
Access control and directory services
Mail and Notification services In the illustrated and described embodiment, the information associated with each service category on the Red list is captured through a hierarchy of (1) package names or definitions, (2) signatures of the APIs and methods present under the utility package, and (3) declarations and other property files such as Deployment Descriptor or Configuration Manager.

With respect to package names or definitions and in the context of the Java-based implementation example, consider the following. The package names "javax.mail" and "javax.activation" are packages representing Java mail services. Similarly, "org.apache.log4j.Logger" implies an Apache Commons library for logging. The packages map to the highest level of services in the hierarchy.

With respect to API signatures and methods consider, for example, that "org.hibernate" is a common object-relationship-mapping utility package which has 11 interfaces and 10 classes. All these interfaces and class signatures for a particular package can be resolved through a code dependency parser. The reason for the use of this information is described below.

With respect to declarations in other property files, consider that for Apache Tomcat, the JNDI Datasource parameters can be described under Resource parameters element in a Server.xml file. This information is also captured in the Red List.

Stage 2

In stage 2, for a target PaaS platform such as Heroku or CloudFoundry, a corresponding hierarchical category of the technical utility services is created. The hierarchical category is referred to as a "Blue List". As the PaaS platforms are relatively recent and immature, not all of the technical services in the enterprise Red list are expected to be present in the Blue list. To illustrate and in the context of the Java-based example, the Java Messaging Service utility like Apache ActiveMQ which provides messaging and routing services may not be present in the Blue list of certain target PaaS platforms. In other words, in at least some cases, the Blue list is a subset of the capabilities present in the Red list. Even when the technical service is present in the target PaaS platform, only subset of the APIs may be valid for usage. For example, the package org.apache.log4j.Logger may be present in a target PaaS Java environment, but the logs cannot be written or appended in the local file system (as the corresponding PaaS application container may not support durable local file systems). Separate Fact Tables are created for PaaS-specific Blue lists in a Rules database.

Stage 3

In stage 3, a set of advisories and recommendations are written to capture changes that may be required in the code, in terms of structure and organization, to alleviate problems identified during migration assessment. The advisory can take any suitable form or format. In the illustrated and described embodiment, the advisory can be of three types depending on the nature of the violation reported. A discussion of how to generate violations during assessment is provided below.

If a violation is not reported or is insignificant, then no advisory is generated. If a violation is of medium severity in the sense that some code modification or rework can mitigate the issue, then an advisory is provided as a general prescription to the code/configuration changes required. If the violation is severe, meaning that a major code prescription is required, then an advisory indicating that a thorough code re-write or target platform change is necessary is issued.

As an example, and drawing upon the examples mentioned above, consider the following. When the technical service under consideration is an object-relationship-mapping module like "org.hibernate" package, one does not expect to have any object persistence mapping violation for a majority of the target PaaS platforms (e.g., Heroku, CloudFoundry, and the like) that the migration assessment tool supports. Hence, no advisory will be issued. In case of a technical service such as logging, the violation is of medium severity as one cannot write logs to a local file system in a PaaS. Hence, the Interface org.apache.log4j.RollingFileAppender under the package org.apache.log4j.Logger may not be of use. The advisory, in this instance, will state that one can redirect logging to the console (using ConsoleAppender interface) or to the database (using JDBCAppender interface) and thus, can continue using the same technical utility.

In the illustrated and described example, the three stages discussed just above are periodic manual activities in which the knowledgebase of the facts and advisories is created, updated and maintained. Facts regarding the Red and Blue lists can be updated periodically to add more technical service packages and APIs, and also to reflect changes in the cloud run-time environment over time. New Blue list fact tables can get added when a new PaaS platform is taken up for migration analysis.

Having considered the three manual stages described above, consider now a discussion of example automated analysis and assessment stages.

Stage 4

In stage 4, referred to as an "Analysis stage", the package archive related to a candidate application is analyzed to find out how many of the technical services present in the applications maps into a Red list. For example, in the Java-based example, bytecode libraries and configuration and environmental parameter files can be analyzed. In the illustrated and described embodiment, an analyzer (e.g., an analysis engine described below) seeks and captures signatures (i.e. patterns) of the Red List categories that appear within the code. In the Java-based example, the archival (jar) file libraries are used because recourse is taken to dependency pointer management utilities present in the library packages to recursively search all dependent files for a particular pattern. In non-Java-based scenarios, other file types can be analyzed in a similar fashion. For example, the approach described herein can be employed in scenarios where code dependency analysis and pattern detection is performed programmatically.

At the end of this process, metadata containing the packages that are present in the application files are extracted and a report is created highlighting related code statements that represent a dependency to a technical service type in the Red list. During the Analysis stage, care can be taken to not only identify an imported technical service class, but also to ascertain whether the class is actually invoked in the code. This helps to reduce the false positive cases. This explains why a hierarchical category structure can be used as well as a Java dependency parser in the analysis tool.

Stage 5

In stage 5 or the "Assessment stage", a mapping is done between the extracted patterns from the application code and the elements of the Blue list for the target PaaS platform. For each extracted pattern (service category or type) in the analysis metadata, a lookup is performed in the Blue list. The mapping can be performed in a hierarchical manner. If a match is found at the top level service type, the next (API or interface signature) level patterns are then checked with regular expression (RegEx) based mapping. In some cases more than one pattern is to be mapped (for example, an API as well as a parameter setting in a config file) to get a match. The violations, if any, are reported based on the match types based on whether complete, partial or no mapping could be performed. Any suitable type of format can be used to report violations, examples of which are provided below.

Having considered an example multi-stage process for migration assessment, consider now an example method in accordance with one or more embodiments.

Example Method

Figure 2:
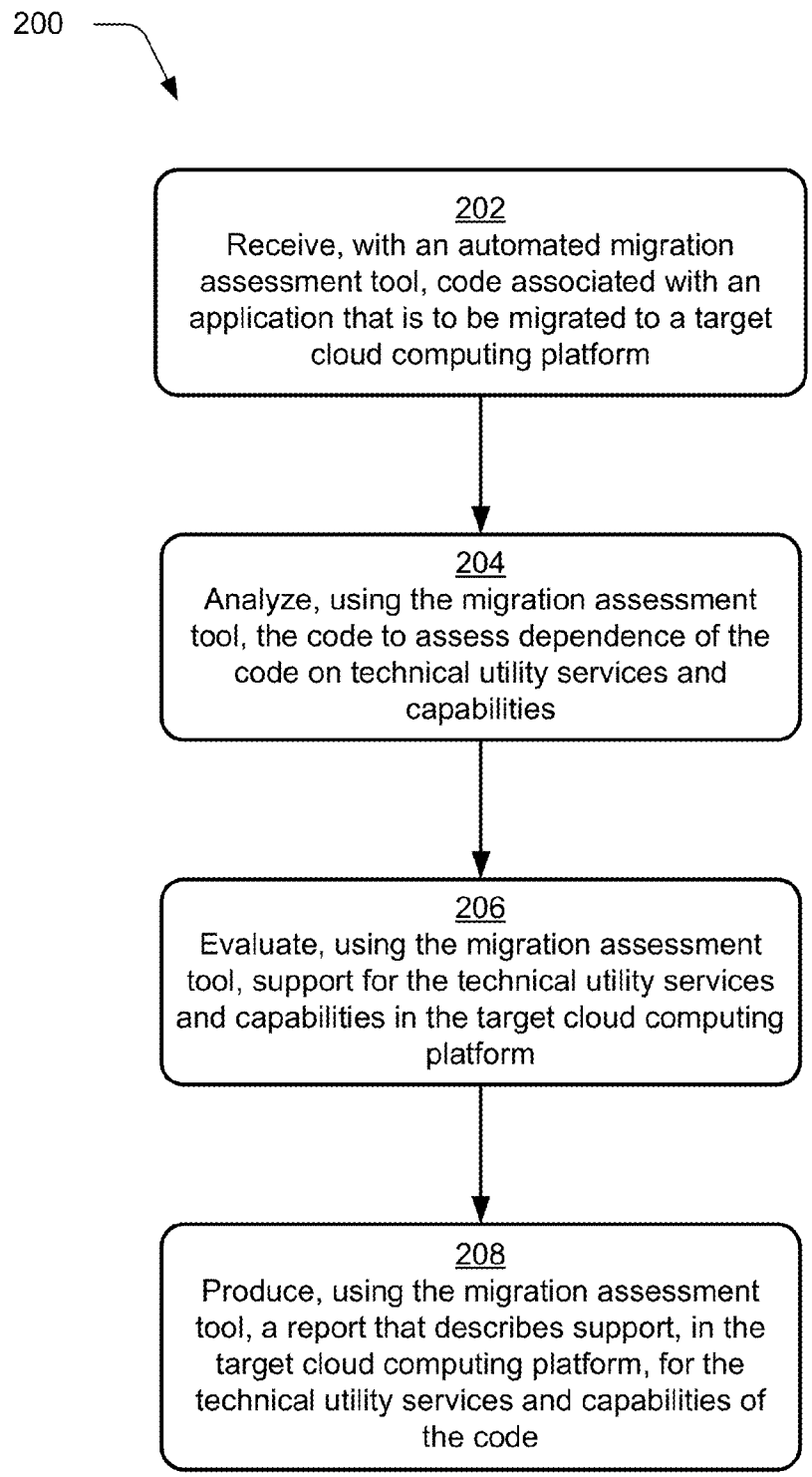
FIG. 2 is a flow diagram that describes a method in accordance with one or more embodiments.

FIG. 2 is a flow diagram that describes operations in a method 200 in accordance with one or more embodiments. The method can be performed in connection with any suitable hardware, software, firmware, or combination thereof. In the embodiment about to be described, the method can be performed in connection with a suitably-configured migration assessment tool, examples of which are provided above and below.

At block 202 an automated migration assessment tool receives code associated with an application that is to be migrated to a target cloud computing platform. Any suitable type of code can be received. In at least some embodiments, the code can comprise Java byte-code, as well as configuration and environment parameter files. It is to be appreciated and understood, however, that code other than Java byte-code can be utilized without departing from the spirit and scope of the claimed subject matter. In the illustrated and described embodiment, the target cloud computing platform comprises a PaaS platform such as the ones described above and below.

At block 204 the migration assessment tool is used to analyze the code to assess dependence of the code on technical utility services and capabilities. This step can be performed in any suitable way. For example, this step can be performed by analyzing the code to produce signatures or patterns such as those described above. The signatures or patterns can then be mapped to a list, referred to as the Red list above, that describes the typical capabilities and services used in a traditional deployment technology. In Java-specific implementations, this step can be performed by analyzing archival (jar) file libraries as described above.

At block 206 the migration assessment tool is used to evaluate support for the technical utility services and capabilities in the target cloud computing platform. The step can be performed in any suitable way. For example, this step can be performed by mapping patterns extracted from the code to elements on a second list, referred to as the Blue list above. The Blue list contains information about the level of support for services or capabilities in the particular target cloud computing platform.

At block 208 the migration assessment tool is used to produce a report that describes support, in the target cloud computing platform, for the technical utility services and capabilities of the code. The report can enable a user to ascertain a high level, as well as a detailed view of the migration assessment for different services. The report can include migration suitability indicators and recommendations to allow the user to evaluate the suitability and complexity of migrating the application to a particular target cloud computing platform. Any suitable report format can be utilized, examples of which are provided below.

Having considered various aspects associated with an automated migration assessment tool, consider now an implementation example in accordance with one or more embodiments.

Implementation Example—Migration Assessment Tool

Recall that in stages 1 and 2 above, a Red list and a Blue list are created. The Red list is a taxonomy and hierarchical categorization of different external technical utility services used in a traditional deployment technology. The Blue list contains information about the level of support for a service or technical capability in a particular PaaS. The Red and Blue lists can be represented in any suitable type of format.

In the illustrated and described embodiment, the Red list and Blue list are XML files and have a structure that stores technical service patterns and capabilities.

FIG. 3 illustrates an excerpt of the hierarchical structure of the Red List in accordance with one embodiment, generally at 300. At the root level, the XML tag is <services>. The subsequent tag in the hierarchy is <serviceCategory> which has a "name" attribute that describes the name of a particular service category and a "descr" attribute that provides a brief description of an associated service category. For example, the first service category is "Framework" which pertains to an application framework for developing Java applications.

Each service category can contain a number of <serviceType> tags each with its own name and description attributes. The serviceType defines typical technical services such as, by way of example and not limitation, Java-FileServices, RabbitMQ (i.e. open-source message broker software that implements the Advanced Message Queuing Protocol (AMQP) standard), and the like. Each serviceType has a <searchInSource> tag which indicates a location to search for the patterns corresponding to this serviceType. In this particular example, the locations include "source", "config", or "sourceOrConfig", thus indicating to search source files only, config files only, both source and config files, or any one of the two, respectively.

Next, two tags—<searchInType> and <searchInStyle>—indicate the type of ensuing search pattern and whether it is mandatory or optional. The innermost tag is <pattern> which is the signature that is searched in the indicated source. In the illustrated and described embodiment, the pattern is either an API signature or a regular expression which can occur in a code or configuration file. Note that a single serviceType can have multiple such patterns which can be defined using such a structure.

FIG. 4 illustrates an excerpt of a Blue list in accordance with one embodiment. In this particular example, the Blue list has a somewhat simpler structure than the Red list. Like the Red list, the Blue list has a <services> tag as the top level in the hierarchy. This is followed by the <serviceCategory> tag. Similarly, the next level tag is <serviceType> along with its associated name and version. Note that a service category or service type may or may not be present in a Blue list, depending on information available about the same in a particular PaaS. However, if present, the serviceCategory and serviceType name is kept consistent with the one appearing in the Red list. This later forms the basis for mapping a detected service pattern.

In the illustrated and described embodiment, each serviceType also has the following tags: <support>, <recommendation>, <extraCaveats>, <sampleCode>, and <toBeCode>.

In this particular example, the <support> tag can have a value that is either a "G", "A", or, "R" which denotes the level of support in the particular PaaS as "Green", "Amber", or "Red" respectively. For support as "G", there is no change recommended to the code while migrating to the PaaS platform. For support as "R", the technical service pattern is completely unsupported in the target PaaS. For "A", some changes would be required. An advisory and additional information explaining this categorization is provided in the <recommendation> and <extraCaveats> tags. The <sampleCode> and <toBeCode> tags contain code snippet examples of the pattern in code, and how it should be changed to migrate to the target PaaS, respectively.

Having considered example Red and Blue lists, consider now an example migration assessment tool architecture in accordance with one or more embodiments.

Figure 5:
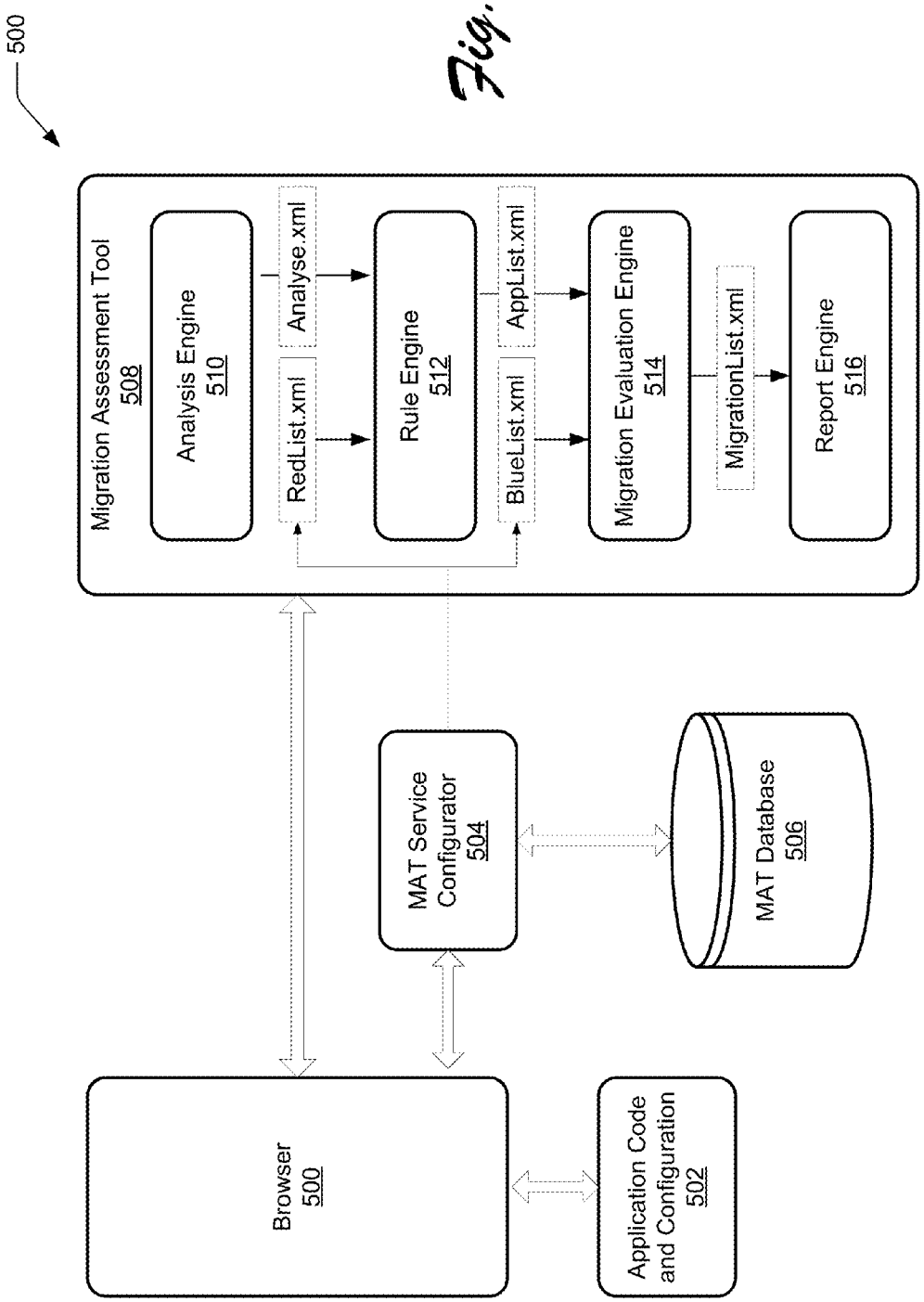
FIG. 5 illustrates an example migration assessment tool in accordance with one or more embodiments.

FIG. 5 illustrates an example system in accordance with one or more embodiments, generally at 500. The system includes a web browser 500, application code and configuration data 502, a migration assessment tool (MAT) service configurator 504, a migration assessment tool (MAT) database 506, and a migration assessment tool 508. The migration assessment tool 508 includes an analysis engine 510, a rule engine 512, a migration evaluation engine 514 and a report engine 516.

System 500 is implemented in a web-based environment that utilizes browser 500 to enable a user to interact with the migration assessment tool 508 and the service configurator 504. Application code and configuration data 502 represents an application that is undergoing migration assessment by the migration assessment tool 508. The MAT service configurator 504 is used to pick various services available in an enterprise application from MAT database 506 which stores information associated with the available services. This information is used to build the Red list. The MAT service configurator 504 can also be used to update the Red list. Similarly the MAT service configurator 504 can be used to update the Blue list for the different PaaS platform(s). The Red and Blue lists are then used internally by the migration assessment tool 508 and, more specifically, by its different engines as described below. It should be noted that the MAT service configurator 504 is illustrated as residing outside the migration assessment tool 508 as it can be used independently to update various rule sets that are stored in the MAT database.

Moving to the migration assessment tool 508, the analysis engine 510 is configured to perform a static analysis of an application (e.g., application code and configuration 502) to be evaluated for migration to a target PaaS. In the illustrated and described embodiment, the analysis engine 510 uses two analysis tools internally to perform this task. In the Java-based example, the analysis engine 510 analyzes the byte code of a selected candidate application to be migrated. In this example, this is done using the ASM tool, which is a Java bytecode manipulation and analysis framework, as will be appreciated by the skilled artisan. The analysis engine 510 utilizes this to extract the dependencies in the application. This dependent information pertaining to the application's classes is written to an XML file, represented in the figure as "Analyse.xml".

In the illustrated and described embodiment, the analysis engine 510 performs analysis of the application's .jar files containing libraries and code which the application might be using (or dependent on) using a jar analyzer. The jar analyzer is a dependency management utility for jar files. The jar analyzer traverses through a directory, parses each of the jar files in that directory, and identifies the dependencies between the jar files. The output from the jar analyzer is an XML file representing the physical dependencies between the jar files. Both the application's internal jars, as well as third party jars, can be easily recognized and analyzed in this manner. If the application has dependencies on private jars developed within a particular organization, the analysis engine 510 can analyze those jars for any dependencies, by extracting the class files contained within those jar files and analyzing them through the ASM tool. The analysis engine 510 thus has the capability to recursively analyze the application's dependencies to any depth. In the present implementation example, a depth of three levels is used.

In this particular example, the rule engine 512 is implemented as a Drools rule engine, as will be appreciated by the skilled artisan. The rule engine 512 receives both the Red list (RedList.xml) from the MAT service configurator 504 and the output of the analysis engine 510 (e.g. Analyse.xml) resulting from analysis of the application desired to be migrated to the PaaS. The Red list is consumed by the rule engine 512 and stored as an object through Java Architecture for XML Binding (JAXB) during the analysis. The rule engine 512 is then used to fire rules which attempt to match the patterns in the Red List with the dependency information file (e.g. Analyse.xml) pertaining to the application bytecode generated by the analysis engine 510. This process thus provides a subset of Red list patterns (e.g. Applist.xml) which are present in the application, as well as information regarding where they are detected in the application.

The migration evaluation engine 514 receives both the Blue list (e.g. BlueList.xml) from the MAT service configurator 504 and the subset of Red list patterns which are present in the application (e.g. Analyse.xml) and maps the patterns detected in the application to the Blue list. As the Blue list contains the technical services supported in a particular PaaS platform, this process helps to detect the support for the particular patterns present in the application. In the illustrated and described embodiment, mapping the patterns detected in the application to the Blue list is performed using an XSLT rule engine. The output of the migration evaluation engine 514 is an XML file (i.e. MigrationList.xml) that describes the results of the migration analysis.

The report engine 516 receives the migration list from the migration evaluation engine 514. The migration list is used by the report engine 516 to create a detailed HTML report using XSLT transformations. The report can also be output in PDF form. The report engine 516 can also be used to browse and download assessments performed and stored as well.

Having considered an example migration assessment tool, consider now a discussion of how the above-described migration assessment tool can be used in accordance with one or more embodiments. In this particular example, the application or code base that is utilized is an application for project management and insights.

Figure 6:
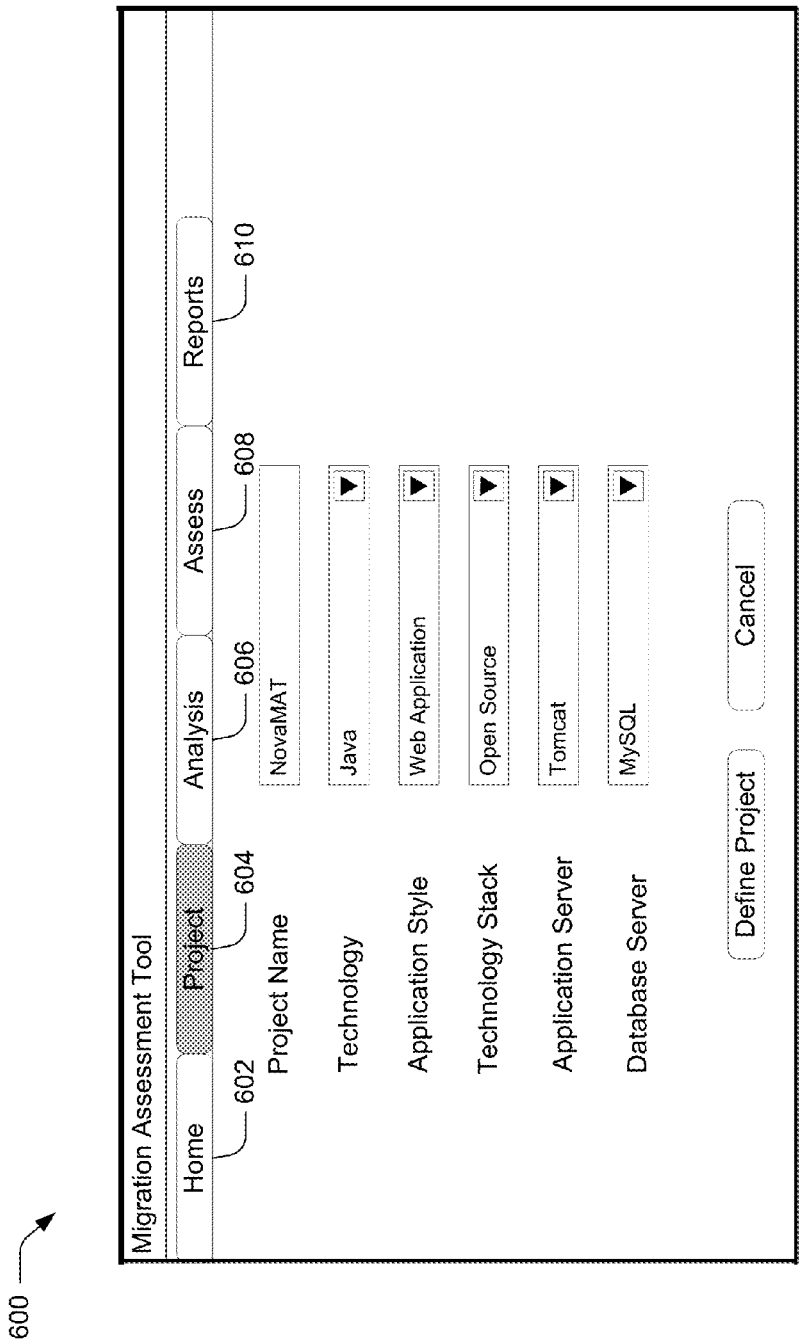
FIG. 6 illustrates a user interface of a migration assessment tool in accordance with one or more embodiments.

FIG. 6 illustrates an example user interface provided by the migration assessment tool in accordance with one or more embodiments, generally at 600. The user interface allows the user to interact with the migration assessment tool to provide various information that is used in the migration assessment analysis. The user interface includes a number of tabs including, by way of example and not limitation, a home tab 602, project tab 604, analysis tab 606, assess tab 608, and a reports tab 610.

The home tab 602 can be selected and provides access to general information about the migration assessment tool.

The project tab 604 can be selected, as it is in the illustration, and enables users to specify parameters about a particular project. In the illustrated and described embodiment, six fields are provided for the user to enter information. The fields include a project name (here, "NovaMAT"), technology, application style, technology stack, application server, and database server. The technology field as well as the fields below it include a drop-down button that can be selected to expose different selections for each field. In this particular example, the technology field has been populated with "Java" to indicate that the assessment is to be performed on a Java application. It is to be appreciated and understood, however, that other technologies can be selected and provided into this field. The application style, technology stack, and the application and database servers are also input and facilitate selection of a subset of Red list patterns most suitable for the analysis. In this particular example, "Web Application" has been entered in the application style field to indicate that a web application is to undergo migration analysis. The applicable technology stack is "Open Source", the application server is "Tomcat" and the database server is "MySQL."

In the example about to be described, the migration assessment tool is used to assess a codebase for an application for project management and insights referred to as PIVoT, described in V. S. Sharma and V. Kaulgud, "Pivot: Project insights and visualization toolkit," in *Emerging Trends in Software Metrics (WETSoM)*, 2012 $3^{rd}$ *International Workshop* on June 2012, pp. 63-69.

The analysis tab 606 enables the user to enter various information that is used to conduct the migration assessment. For example, the information entered by the user can be used to enable the migration assessment tool to conduct its analysis with respect to the Red list.

Figure 7:
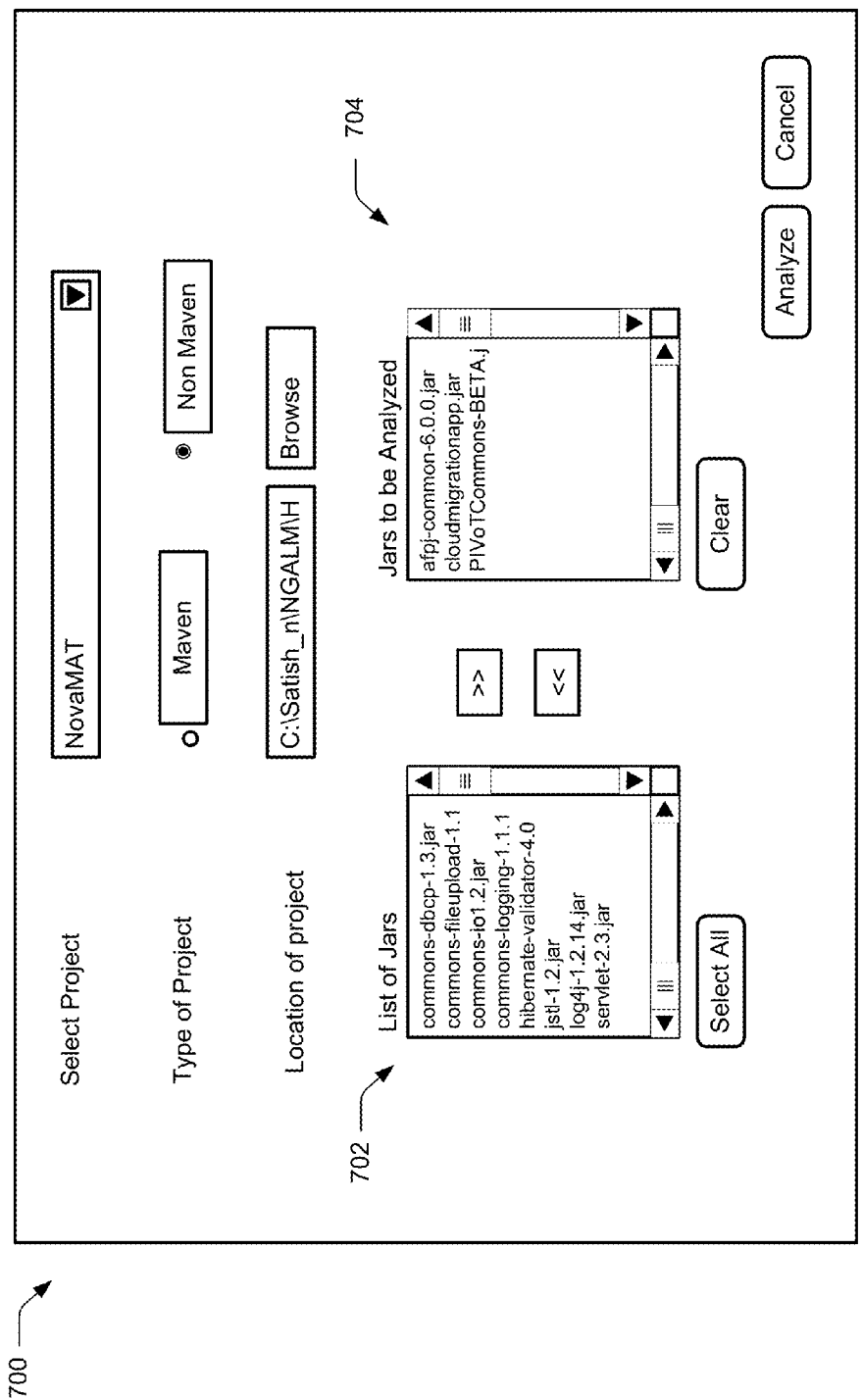
FIG. 7 illustrates a user interface of a migration assessment tool in accordance with one or more embodiments.

As an example, consider FIG. 7 which illustrates a user interface, in accordance with one embodiment, that can be accessed by selecting the analysis tab. In this example, the user can select a project—here, "NovaMAT" and can designate a project type. In this instance, the project type is either a Maven or Non-Maven type. The reason for this is that the code tree of the Maven based applications is organized differently and the dependency checker works differently. Next, the user can specify the location of the application project. Based on the location of the application project, the migration assessment tool populates a list of jars on the same page, in a user interface instrumentality shown generally at 702. The user can now select which jars are to be analyzed in a detailed manner, apart from the application source code which is analyzed by default, as part of the migration assessment processing. For example, many jars may be standard external libraries and, as such, the use of ASM on the bytecode is enough to ascertain the patterns it embodies. In other cases, for the internal jars which, in turn, are dependent on such standard jars internally, the internal structure is assessed for a detailed analysis of its dependencies for migration analysis. This more involved analysis uses the jar analyzer discussed above. The list of jars to be analyzed is displayed for the user in a user interface instrumentality shown generally at 704.

After the user has selected all of the appropriate jars to be analyzed, an "Analyze" button may be selected to have the migration assessment tool perform its analysis and produce a code analysis report.

FIG. 8 illustrates a code analysis report generated by the migration assessment tool in accordance with one embodiment. The code analysis report is generated after the application has been analyzed with respect to the Red list. The report shows various patterns pertaining to use of technical services and platform capabilities that are present in the application. The illustrated report includes a "Service Category" section which lists various service categories and a description of each. The report also includes a "Service Type" section as well as an associated description. Further, the report includes a "File" section which identifies files for which various patterns have been found, a "Pattern Detected" section which lists the associated pattern, a "Line Content" section which lists line content associated with the pattern, and a "Dependency Level" which identifies associated dependency levels.

In the present example, one of the analysis patterns which maps to the File Services pattern is shown. The pattern is found in a source code file called "MigrationController.java". However the use of file services is indirect. Specifically, the file services are used through a library called PIVoTCommons.jar, which has a class called 'PivotStream' which actually makes use of the java.io.FileInputStream package. The source file in the application invokes an instance of this class, and thus can indirectly initiate the use of Java file services. This example constitutes a second level pattern detection. This is shown by the two arrows in 'Dependency Level' column in this report.

Once the patterns present in the application project are detected, the user can click the assess tab 608 (FIG. 6) to be presented with a user interface that allows them to select a particular PaaS. As an example, consider FIG. 9 which shows an example user interface in accordance with one embodiment, generally at 900.

User interface 900 enables the user to select a project—here, "NovaMAT", identify a target PaaS—here, "Heroku", and click an "Analyze" button to have the migration assessment tool proceed with the migration assessment with respect to the selected PaaS.

Figure 10:
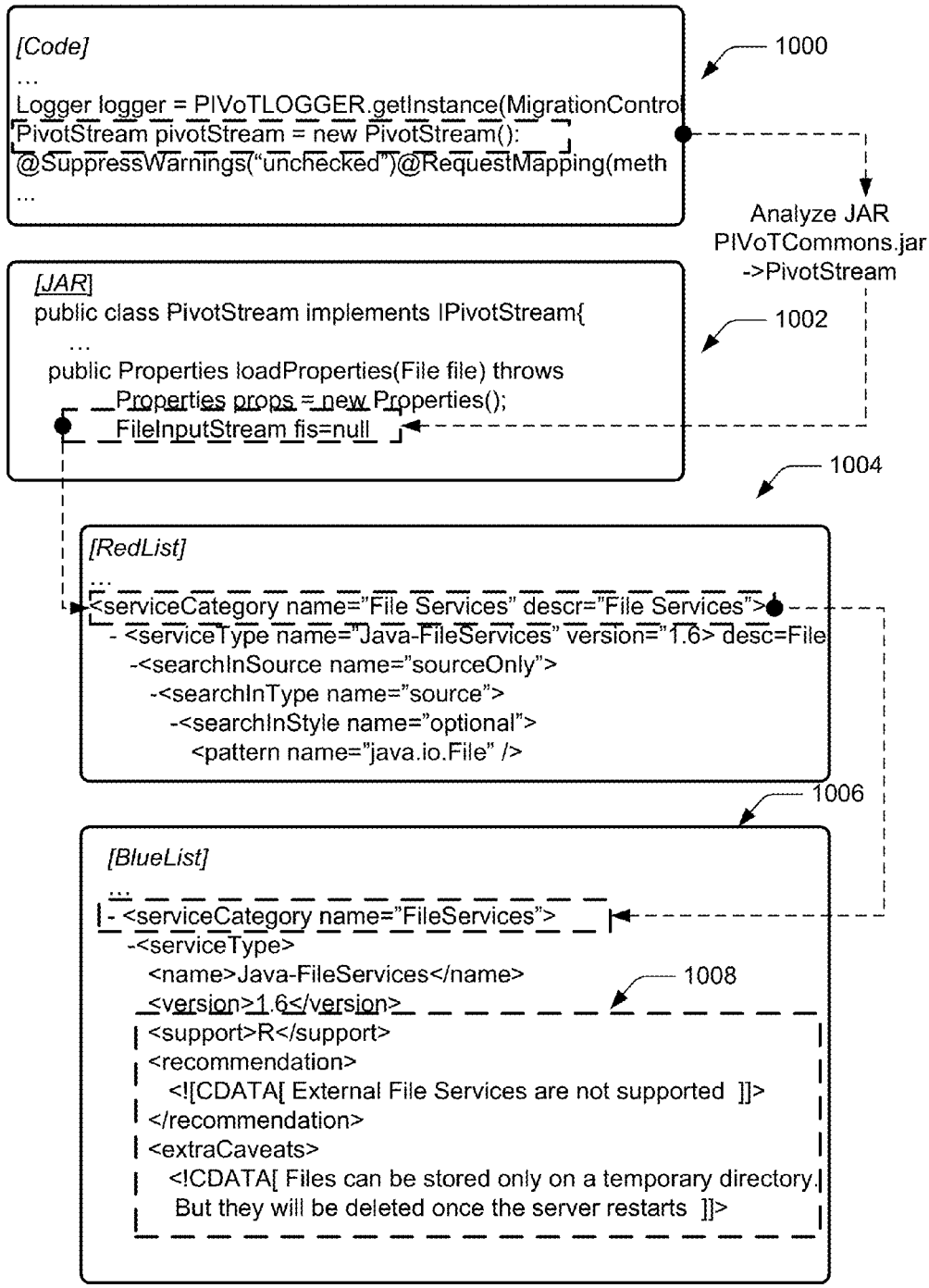
FIG. 10 illustrates aspects of an internal process utilized by the migration assessment tool in accordance with one or more embodiments.

FIG. 10 illustrates the internal process of detecting and mapping technical service patterns in code, an excerpt of which is shown at 1000. In this example, the code creates an object 1002 of a class defined in a JAR file. Hence, the JAR file is analyzed for the pertinent class file. The code in this file exhibits the use of the File Services service category defined in the Red List at 1004. Thus, this technical service pattern has been detected. Next, the corresponding PaaS's Blue List 1006 is checked to find the support for the particular pattern. In this case, external file services are not supported, as indicated at 1008, with an extra caveat that files can be temporarily stored, but will be deleted anytime the PaaS's internal servers restart. This information is then used to populate an assessment report. As an example, consider FIGS. 11 and 12.

Figure 12:
FIG. 12 illustrates a further portion of the example report of FIG. 11 in accordance with one or more embodiments.

Collectively, FIGS. 11 and 12 illustrate an example migration assessment report which, because of spacing constraints, has been split between two different figures. Using the report, the user can view a particular PaaS's support for the various patterns found in the application project. The assessment report provides a "Support Status" (FIG. 12) which uses a visual icon, an example of which is shown at 1200, to convey the level of support provided by a particular PaaS. Any suitable type of visual icon or other representation can be utilized. In the illustrated and described embodiment, the visual icon can assume three different colors—green amber or red. A green icon means that a PaaS provides full support without any changes to the application's code. An amber icon means that the particular PaaS provides support, but with some code changes. A red icon means that the code feature is not supported on the target PaaS.

If the status is green or red, typically a reason for the same is provided in the "Advisory" column (FIG. 12). However, if the status is amber, detailed information about how the code should be changed is provided in the report. For example, here the limitation with respect to File-based logging is that Heroku provides only ephemeral file storage. The solution, as set forth in the "Advisory" column, is to change the configuration of the logging framework to log on the console rather than on a file. An example of this is provided through the "As Is Code" and the "To Be Code" columns.

In one or more embodiments, the migration assessment tool also provides an ability to compare migration assessments as between different PaaS platforms. This provides the user with an ability to ascertain whether and how services and capabilities are supported by different PaaS platforms through a side-by-side comparison. This, in turn, can provide the user with an ability to make trade-off decisions with respect to which PaaS platform to utilize. As an example, consider FIG. 13.

There, a user interface in accordance with one embodiment is shown generally at 1300. In this example, the user interface includes a column entitled "Services" which lists various services utilized by an application that has undergone migration assessment. In addition, two columns are provided each of which represents a different PaaS (i.e. Cloud Foundry and Heroku). In this example, the services that are utilized by the application have a corresponding icon beneath each different PaaS indicating the support status of the PaaS for that service. This type of report can allow the user to quickly ascertain the level of support offered by a particular PaaS.

Conclusion

The embodiments described above provide an assessment tool that enables an automated functional assessment of applications for migration to a target Platform as a Service (PaaS) platform to be performed. The technical capabilities of various types of applications in a traditional non-PaaS deployment are studied and support for these technical capabilities is evaluated relative to the target PaaS platform.

In one or more embodiments, two rich sets of capability repositories are created and utilized during an application's automated functional assessment. A first of the repositories is an extendable Red List which corresponds to the typical capabilities and services used in a traditional deployment technology. The Red List contains the various technical services and their classification with their corresponding code pattern which the automated assessment tool can detect in code. A second of the repositories is an extendable Blue List which contains information pertaining to the level of support for service or technical capability in the particular PaaS. Each PaaS typically has a different Blue List. In one or more embodiments, the Blue List can further include a set of recommendations to allow the use of an otherwise non-supported service or capability on the respective PaaS.

For migration assessment, a user typically submits the application code to the automated assessment tool along with some auxiliary information through a user interface. The automated assessment tool then uses the Red List to detect various patterns of different functional capabilities and services within the code. The detected patterns are then checked against the Blue List for one or more target PaaS platforms and, for each capability or service, a migration suitability indicator (e.g., Green, Amber, and Red) is assigned. The analysis results are then presented to the user through a dynamic user interface in which the user can receive a high level view, as well as a detailed view of the migration assessment for different services. Through the indicators and the recommendations presented in this user interface, the user can evaluate the suitability and complexity of migrating the application to a particular PaaS.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A computer-implemented method comprising:
   receiving, with an automated migration assessment tool executed by a processor, code associated with an application that is to be migrated to a target cloud computing platform, a deployment list of technical utility services and capabilities for a deployment system, and a target list of technical utility services and capabilities for the target cloud computing platform;
   determining, using the automated migration assessment tool, dependencies of the code on technical utility services and capabilities;
   producing, using the automated migration assessment tool, a dependency information file including the dependencies;
   matching, using the automated migration assessment tool, patterns in the deployment list with information in the dependency information file;
   producing, using the automated migration assessment tool, a pattern list based on the matching, wherein the pattern list includes a subset of patterns that are present in the code and the deployment list;
   mapping, using the automated migration assessment tool, the pattern list to the target list for the target cloud computing platform;
   producing, using the automated migration assessment tool, a migration list based on the mapping to evaluate support for dependent technical utility services and capabilities of the application in the target cloud computing platform; and
   moving the application to the target cloud computing platform based on the migration list.

2. The method of claim 1, wherein the target cloud computing platform comprises a Platform as a Service (PaaS) platform.

3. The method of claim 1, wherein the code comprises Java byte-code and configuration and environmental parameter file.

4. The method of claim 1, wherein said code comprises one or more .jar files.

5. The method of claim 1 further comprising producing a report that describes support, in the target cloud computing platform, for the dependent technical utility services and capabilities.

6. The method of claim 5, wherein the report includes migration suitability indicators and recommendations to allow an evaluation of migrating the application to the target cloud computing platform.

7. One or more non-transitory computer readable storage media embodying computer readable instructions which, when executed by at least one processor, implement
an automated migration assessment tool to allow migration assessment of code that is to be migrated to a Platform as a Service (PaaS) platform, the migration assessment tool comprising:
an analysis engine to assess code dependence on technical utility services and capabilities and produce a dependency information file;
a rule engine to attempt to match patterns in a deployment list of technical utility services and capabilities for the system with information appearing in the dependency information file to produce a pattern list of a subset of patterns that are present in the code and the deployment list;
a migration evaluation engine to map the pattern list to a target list of technical services supported by the PaaS platform to produce a migration list; and,
a report engine to process the migration list to create a report that describes support, in the PaaS platform, for the subset of patterns present in the code, wherein the code is moved to the PaaS platform based on the migration list.

8. The one or more non-transitory computer readable storage media of claim 7, wherein the analysis engine is configured to assess .jar file dependencies.

9. The one or more non-transitory computer readable storage media of claim 7, wherein the migration assessment tool is to provide the report as an HTML report.

10. The one or more non-transitory computer readable storage media of claim 7, wherein the migration assessment tool is to provide the report as a PDF report.

11. The one or more non-transitory computer readable storage media of claim 7, wherein the report includes migration suitability indicators and recommendations to allow an evaluation of migrating the code to the PaaS platform.

12. The one or more non-transitory computer readable storage media of claim 7, wherein the migration assessment tool includes a user interface comprising a user interface instrumentality to allow a user to select files that are to be analyzed by the analysis engine.

13. The one or more non-transitory computer readable storage media of claim 12, wherein the files comprise .jar files.

14. The one or more computer readable storage media of claim 7, wherein the report engine is to produce a report that allows comparison between multiple PaaS platforms.

15. A computing device comprising:
one or more processors;
one or more non-transitory computer readable storage media embodying computer readable instructions which, when executed by the one or more processors implement a migration assessment tool to allow migration assessment of code that is to be migrated to a Platform as a Service (PaaS) platform, the migration assessment tool executing a method comprising:
analyzing the code and producing an XML dependency file that describes the code's dependencies on technical utility services and capabilities;
matching patterns in a hierarchical deployment list of technical utility services and capabilities with dependencies described in the XML dependency file to produce an XML pattern list that describes a subset of patterns present in the code and the hierarchical deployment list;
processing the XML pattern list to map the subset of patterns present in the code to a hierarchical target list of technical services supported by the PaaS platform to produce a migration list;
creating a report that describes support, in the PaaS platform, for the subset of patterns; and
moving the code to the PaaS platform based on the support, described in the report, for the subset of patterns in the PaaS platform.

16. The computing device of claim 15, wherein the report includes a support status in the form of a visual icon to convey a level of support provided by the PaaS platform.

17. The computing device of claim 16, wherein the visual icon changes colors depending on the level of support.

18. The computing device of claim 15, wherein the report includes information about how the code should be changed in order to be migrated to the PaaS platform.

* * * * *